(12) United States Patent
Joy et al.

(10) Patent No.: US 8,015,255 B2
(45) Date of Patent: Sep. 6, 2011

(54) SYSTEM AND METHOD FOR NETWORK DEVICE COMMUNICATION

(75) Inventors: Ryan Joy, Austin, TX (US); Gary Faulkner, Austin, TX (US); Michael Primm, Austin, TX (US); Martin John Stich, Austin, TX (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

(21) Appl. No.: 12/627,835

(22) Filed: Nov. 30, 2009

(65) Prior Publication Data

US 2010/0138505 A1 Jun. 3, 2010

Related U.S. Application Data

(63) Continuation of application No. 10/973,931, filed on Oct. 26, 2004, now Pat. No. 7,627,651.

(60) Provisional application No. 60/514,699, filed on Oct. 27, 2003.

(51) Int. Cl.
*G06F 15/16* (2006.01)

(52) U.S. Cl. ........ 709/206; 709/219; 709/232; 709/226; 726/11

(58) Field of Classification Search .......... 709/206–209, 709/219, 229
See application file for complete search history.

(56) References Cited

U.S. PATENT DOCUMENTS

| | | | |
|---|---|---|---|
| 3,810,138 A | 5/1974 | Thompson et al. | |
| 4,349,879 A | 9/1982 | Peddie et al. | |
| 4,521,645 A | 6/1985 | Carroll | |
| 4,568,934 A | 2/1986 | Allgood | |
| 4,636,652 A | 1/1987 | Raes | |
| 4,637,020 A | 1/1987 | Schinabeck | |
| 4,650,347 A | 3/1987 | Shigemura et al. | |
| 4,668,939 A | 5/1987 | Kimura et al. | |
| 4,718,025 A | 1/1988 | Minor et al. | |
| 4,747,041 A | 5/1988 | Engel et al. | |
| 4,751,648 A | 6/1988 | Sears, III et al. | |
| 4,816,208 A | 3/1989 | Woods et al. | |
| 4,823,290 A | 4/1989 | Fasack et al. | |

(Continued)

FOREIGN PATENT DOCUMENTS

AU 3855395 A1 6/1996

(Continued)

OTHER PUBLICATIONS

Axis Communications, "Axis 200+ and 240 Camera Server: User's Guide", www.axis.com/techsup/cam_servers/cam_240/index.htm, pp. 1-38, Jan. 1999.

(Continued)

*Primary Examiner* — Judy J Jean Gilles
(74) *Attorney, Agent, or Firm* — Lando & Anastasi, LLP (57) ABSTRACT

The disclosure is directed to a method for communicating with a monitoring device. The method includes sending an unsolicited-type message from a client program resident on the monitoring device coupled to a first secure network. The unsolicited-type message is sent to a computing system coupled to a second network separated from the first secure network by a firewall. The method also includes receiving a response message to the unsolicited-type message from the computing system. The response message includes an embedded unsolicited-type message. The client program is resident on the monitoring device receiving the response message. The method further includes providing the embedded unsolicited-type message to a server program resident on the monitoring device.

20 Claims, 7 Drawing Sheets

U.S. PATENT DOCUMENTS

| | | |
|---|---|---|
| 4,964,065 A | 10/1990 | Hicks et al. |
| 5,043,807 A | 8/1991 | Rabii |
| 5,061,916 A | 10/1991 | French et al. |
| 5,086,385 A | 2/1992 | Launey et al. |
| 5,097,328 A | 3/1992 | Boyette |
| 5,109,278 A | 4/1992 | Erickson et al. |
| 5,153,837 A | 10/1992 | Shaffer et al. |
| 5,157,732 A | 10/1992 | Ishii et al. |
| 5,189,394 A | 2/1993 | Walter et al. |
| 5,216,623 A | 6/1993 | Barrett et al. |
| 5,220,522 A | 6/1993 | Wilson et al. |
| 5,225,997 A | 7/1993 | Lederer et al. |
| 5,229,850 A | 7/1993 | Toyoshima |
| 5,262,758 A | 11/1993 | Nam et al. |
| 5,289,275 A | 2/1994 | Ishii et al. |
| 5,367,670 A | 11/1994 | Ward et al. |
| 5,382,943 A | 1/1995 | Tanaka |
| 5,395,042 A | 3/1995 | Riley et al. |
| 5,404,136 A | 4/1995 | Marsden |
| 5,475,364 A | 12/1995 | Kenet |
| 5,488,430 A | 1/1996 | Hong |
| 5,491,511 A | 2/1996 | Odle |
| 5,508,941 A | 4/1996 | Leplingard et al. |
| 5,528,507 A | 6/1996 | McNamara et al. |
| 5,548,659 A | 8/1996 | Okamoto |
| 5,553,609 A | 9/1996 | Chen et al. |
| 5,561,476 A | 10/1996 | Kershaw et al. |
| 5,566,339 A | 10/1996 | Perholtz et al. |
| 5,572,195 A | 11/1996 | Heller et al. |
| 5,581,478 A | 12/1996 | Cruse et al. |
| 5,586,202 A | 12/1996 | Ohki et al. |
| 5,588,067 A | 12/1996 | Peterson et al. |
| 5,589,764 A | 12/1996 | Lee |
| 5,602,585 A | 2/1997 | Dickinson et al. |
| 5,621,662 A | 4/1997 | Humphries et al. |
| 5,659,470 A | 8/1997 | Goska et al. |
| 5,664,202 A | 9/1997 | Chen et al. |
| 5,715,160 A | 2/1998 | Plotke |
| 5,731,832 A | 3/1998 | Ng |
| 5,732,074 A | 3/1998 | Spaur et al. |
| 5,742,762 A | 4/1998 | Scholl et al. |
| RE35,793 E | 5/1998 | Halpern |
| 5,768,430 A | 6/1998 | Takashima et al. |
| 5,798,798 A | 8/1998 | Rector et al. |
| 5,805,458 A | 9/1998 | McNamara et al. |
| 5,812,055 A | 9/1998 | Candy et al. |
| 5,818,725 A | 10/1998 | McNamara et al. |
| 5,822,302 A | 10/1998 | Scheetz et al. |
| 5,829,130 A | 11/1998 | Miller |
| 5,892,440 A | 4/1999 | Bryan |
| 5,905,867 A | 5/1999 | Giorgio et al. |
| 5,926,210 A | 7/1999 | Hackett et al. |
| 5,937,092 A | 8/1999 | Wootton et al. |
| 5,937,097 A | 8/1999 | Lennon |
| 5,949,974 A | 9/1999 | Ewing et al. |
| 5,955,946 A | 9/1999 | Beheshti et al. |
| 5,963,457 A | 10/1999 | Kanoi et al. |
| 5,968,116 A | 10/1999 | Day, II et al. |
| 5,974,237 A | 10/1999 | Shurmer et al. |
| 5,978,594 A | 11/1999 | Bonnell et al. |
| 5,978,912 A | 11/1999 | Rakavy et al. |
| 5,987,614 A | 11/1999 | Mitchell et al. |
| 5,991,885 A | 11/1999 | Chang et al. |
| 6,001,065 A | 12/1999 | Devito |
| 6,052,750 A | 4/2000 | Lea |
| 6,055,480 A | 4/2000 | Nevo et al. |
| 6,057,834 A | 5/2000 | Pickover |
| 6,058,434 A | 5/2000 | Wilt et al. |
| 6,078,253 A | 6/2000 | Fowler |
| 6,081,606 A | 6/2000 | Hansen et al. |
| 6,085,243 A | 7/2000 | Fletcher et al. |
| 6,088,816 A | 7/2000 | Nouri et al. |
| 6,094,676 A | 7/2000 | Gray et al. |
| 6,100,806 A | 8/2000 | Gaukel |
| 6,104,755 A | 8/2000 | Ohara |
| 6,105,061 A | 8/2000 | Nakai |
| 6,108,782 A | 8/2000 | Fletcher et al. |
| 6,112,235 A | 8/2000 | Spofford |
| 6,115,468 A | 9/2000 | De Niccolo |
| 6,122,603 A | 9/2000 | Budike, Jr. |
| 6,125,145 A | 9/2000 | Koyanagi et al. |
| 6,138,078 A | 10/2000 | Canada et al. |
| 6,138,249 A | 10/2000 | Nolet |
| 6,139,177 A | 10/2000 | Venkatramana et al. |
| 6,144,770 A | 11/2000 | Lennon |
| 6,148,262 A | 11/2000 | Fry |
| 6,157,943 A | 12/2000 | Meyer |
| 6,160,584 A | 12/2000 | Yanagita |
| 6,160,926 A | 12/2000 | Dow et al. |
| 6,167,406 A | 12/2000 | Hoskins et al. |
| 6,170,007 B1 | 1/2001 | Venkatraman et al. |
| 6,173,323 B1 | 1/2001 | Moghe |
| 6,175,866 B1 | 1/2001 | Holloway et al. |
| 6,175,927 B1 | 1/2001 | Cromer et al. |
| 6,177,884 B1 | 1/2001 | Hunt et al. |
| 6,182,094 B1 | 1/2001 | Humpleman et al. |
| 6,182,157 B1 | 1/2001 | Schlener et al. |
| 6,189,109 B1 | 2/2001 | Sheikh et al. |
| 6,195,018 B1 | 2/2001 | Ragle et al. |
| 6,208,261 B1 | 3/2001 | Olstead |
| 6,208,345 B1 | 3/2001 | Sheard et al. |
| 6,215,404 B1 | 4/2001 | Morales |
| 6,219,628 B1 | 4/2001 | Kodosky et al. |
| 6,229,429 B1 | 5/2001 | Horon |
| 6,236,332 B1 | 5/2001 | Conkright et al. |
| 6,246,780 B1 | 6/2001 | Sato |
| 6,259,956 B1 | 7/2001 | Myers et al. |
| 6,266,721 B1 | 7/2001 | Sheikh et al. |
| 6,271,845 B1 | 8/2001 | Richardson |
| 6,281,790 B1 | 8/2001 | Kimmel et al. |
| 6,282,546 B1 | 8/2001 | Gleichauf et al. |
| 6,298,144 B1 | 10/2001 | Pucker, II et al. |
| 6,304,900 B1 | 10/2001 | Cromer et al. |
| 6,311,105 B1 | 10/2001 | Budike, Jr. |
| 6,311,214 B1 | 10/2001 | Rhoads |
| 6,324,644 B1 | 11/2001 | Rakavy et al. |
| 6,329,792 B1 | 12/2001 | Dunn et al. |
| 6,332,202 B1 | 12/2001 | Sheikh et al. |
| 6,338,094 B1 | 1/2002 | Scott et al. |
| 6,360,255 B1 | 3/2002 | McCormack et al. |
| 6,363,421 B2 | 3/2002 | Barker et al. |
| 6,363,422 B1 | 3/2002 | Hunter et al. |
| 6,373,840 B1 | 4/2002 | Chen |
| 6,374,296 B1 | 4/2002 | Lim et al. |
| 6,375,614 B1 | 4/2002 | Braun et al. |
| 6,381,700 B1 | 4/2002 | Yoshida |
| 6,389,464 B1 | 5/2002 | Krishnamurthy et al. |
| 6,396,534 B1 | 5/2002 | Mahler et al. |
| 6,400,103 B1 | 6/2002 | Adamson |
| 6,400,996 B1 | 6/2002 | Hoffberg et al. |
| 6,402,691 B1 | 6/2002 | Peddicord et al. |
| 6,404,348 B1 | 6/2002 | Wilfong |
| 6,405,216 B1 | 6/2002 | Minnaert et al. |
| 6,477,667 B1 | 11/2002 | Levi et al. |
| 6,496,105 B2 | 12/2002 | Fisher et al. |
| 6,505,256 B1 | 1/2003 | York |
| 6,510,350 B1 | 1/2003 | Steem et al. |
| 6,529,230 B1 | 3/2003 | Chong |
| 6,529,936 B1 | 3/2003 | Mayo et al. |
| 6,553,336 B1 | 4/2003 | Johnson et al. |
| 6,553,418 B1 | 4/2003 | Collins et al. |
| 6,591,279 B1 | 7/2003 | Emens et al. |
| 6,640,145 B2 | 10/2003 | Hoffberg et al. |
| 6,681,787 B2 | 1/2004 | Tinsley et al. |
| 6,714,977 B1 | 3/2004 | Fowler et al. |
| 6,769,025 B1 | 7/2004 | Alles et al. |
| 7,024,474 B2 | 4/2006 | Clubb et al. |
| 7,096,355 B1 * | 8/2006 | Marvit et al. .................. 713/162 |
| 7,627,651 B2 * | 12/2009 | Joy et al. ....................... 709/219 |
| 2001/0005894 A1 | 6/2001 | Fukui |
| 2001/0047213 A1 | 11/2001 | Sepe, Jr. |
| 2001/0047410 A1 | 11/2001 | Defosse |
| 2001/0052006 A1 | 12/2001 | Barker et al. |
| 2001/0055965 A1 | 12/2001 | Delp et al. |
| 2002/0003575 A1 | 1/2002 | Marchese |
| 2002/0023258 A1 | 2/2002 | Elwahab et al. |
| 2002/0041603 A1 | 4/2002 | Kato |

| | | | |
|---|---|---|---|
| 2002/0043969 A1 | 4/2002 | Duncan et al. | |
| 2002/0071031 A1 | 6/2002 | Lord et al. | |
| 2002/0072868 A1 | 6/2002 | Bartone et al. | |
| 2002/0083378 A1 | 6/2002 | Nickels | |
| 2002/0152298 A1 | 10/2002 | Kikta et al. | |
| 2003/0098789 A1 | 5/2003 | Murakami et al. | |
| 2003/0204756 A1* | 10/2003 | Ransom et al. | 713/300 |

FOREIGN PATENT DOCUMENTS

| | | |
|---|---|---|
| AU | 5601198 A1 | 7/1998 |
| AU | 0016673 A5 | 6/2000 |
| CA | 2300053 | 2/1999 |
| CA | 2310275 | 6/1999 |
| CA | 2328939 | 9/1999 |
| CN | 87100353 | 9/1988 |
| CN | 1294350 | 5/2001 |
| EP | 0444997 B1 | 2/1991 |
| EP | 0591585 B1 | 4/1994 |
| EP | 0738065 A1 | 3/1996 |
| EP | 0744112 A1 | 11/1996 |
| EP | 0859489 A2 | 1/1998 |
| EP | 0978780 A1 | 8/1998 |
| EP | 0917034 A1 | 10/1998 |
| EP | 0917034 B1 | 10/1998 |
| EP | 0963076 A3 | 5/1999 |
| EP | 0964551 A1 | 6/1999 |
| EP | 0927933 A2 | 7/1999 |
| EP | 0977112 A2 | 7/1999 |
| EP | 0956680 A1 | 11/1999 |
| EP | 1014622 A2 | 12/1999 |
| EP | 0990986 A2 | 4/2000 |
| EP | 0992100 A2 | 4/2000 |
| EP | 1002268 A1 | 5/2000 |
| EP | 1009130 A | 6/2000 |
| EP | 1032884 A1 | 9/2000 |
| EP | 1049291 A2 | 11/2000 |
| EP | 1115264 A2 | 12/2000 |
| EP | 1124301 A2 | 12/2000 |
| EP | 1096724 A | 5/2001 |
| EP | 1142289 A1 | 10/2001 |
| EP | 1150188 A2 | 10/2001 |
| EP | 1178628 A2 | 2/2002 |
| GB | 9826895 | 1/1999 |
| GB | 9913682 | 8/1999 |
| GB | 2335124 | 9/1999 |
| GB | 2343036 | 4/2000 |
| GB | 2344718 | 6/2000 |
| GB | 2351205 | 12/2000 |
| GB | 2355163 | 4/2001 |
| GB | 2359369 | 8/2001 |
| HU | 9300145 | 8/1993 |
| JP | 3099398 A2 | 4/1991 |
| JP | 5040889 A2 | 2/1993 |
| JP | 6105376 | 4/1994 |
| JP | 6119581 A2 | 4/1994 |
| JP | 8307541 A2 | 11/1996 |
| JP | 11164035 A2 | 6/1999 |
| JP | 11219388 A2 | 8/1999 |
| JP | 2000092092 A2 | 3/2000 |
| JP | 2000134606 A2 | 5/2000 |
| JP | 2000151606 A2 | 5/2000 |
| JP | 2000209204 A2 | 7/2000 |
| JP | 2000278773 A2 | 10/2000 |
| TW | 0443058 | 6/2001 |
| TW | 0448349 | 8/2001 |
| WO | 9521506 | 8/1995 |
| WO | 9615615 | 5/1996 |
| WO | 9730879 | 8/1997 |
| WO | 9801838 | 1/1998 |
| WO | 9826541 | 6/1998 |
| WO | 9918183 | 2/1999 |
| WO | 9915950 | 4/1999 |
| WO | 9927456 | 6/1999 |
| WO | 9945445 | 9/1999 |
| WO | 0035177 | 6/2000 |
| WO | 0039724 | 7/2000 |
| WO | 0054557 | 9/2000 |
| WO | 0073866 A1 | 12/2000 |
| WO | 0079500 A1 | 12/2000 |
| WO | 0101366 A2 | 1/2001 |
| WO | 0108396 | 2/2001 |
| WO | 0169405 C1 | 3/2001 |
| WO | 0127763 | 4/2001 |
| WO | 0157631 | 8/2001 |
| WO | 0161665 A2 | 8/2001 |
| WO | 0169405 A1 | 9/2001 |
| WO | 0169504 A1 | 9/2001 |
| WO | 0179935 A1 | 10/2001 |
| WO | 0157477 C1 | 11/2001 |
| WO | 0182028 A2 | 11/2001 |
| WO | 0193042 A2 | 12/2001 |
| WO | 0193508 A1 | 12/2001 |
| WO | 0197907 A2 | 12/2001 |
| WO | 0199402 A2 | 12/2001 |
| WO | 0201877 A1 | 1/2002 |
| WO | 0211391 A2 | 2/2002 |
| WO | 0237280 A2 | 5/2002 |
| WO | 0247044 | 6/2002 |
| WO | 0247369 | 6/2002 |
| WO | 0248830 A2 | 6/2002 |
| WO | 0249285 A1 | 6/2002 |

OTHER PUBLICATIONS

Axis Communications, "Network Camera Developments Enable Live Web Imaging", Axis 2100 white paper, www.axis.com/products/videso/camera/documentation.htm, pp. 1-12, Nov. 1999.

Axis Communications, "Axis 2400/2401 Administration Manual Version 1.1", www.axis.com/techsup/cam_servers/cam_2400/index.htm, version 1.1.xx, part No. 16741, pp. 1-78, Jul. 1999.

Fossum, "CMOS image sensors; electronic camera-on-a-chip", IEEE Transactions on Electron Devices, vol. 44, iss. 10, pp. 1689-1698, Oct. 1997.

Sinetica Corp., "Newsletter, Issue One 99", Sinetica, UK, www.sinetica.co.uk, Feb. 1999, XP002160504, 4 pp.

Sinetica Corp., "Netcom TH. Advanced SNMP Agent with Web Browser Support", Sinetica, UK, www.sinetica.co.uk, Apr. 2000, XP002160505, 2 pp.

* cited by examiner

SYSTEM AND METHOD FOR NETWORK DEVICE COMMUNICATION

RELATED APPLICATIONS

The present application is a continuation of U.S. patent application Ser. No. 10/973,931 filed on Oct. 26, 2004, entitled SYSTEM AND METHOD FOR NETWORK DEVICE COMMUNICATION, which claims the benefit of U.S. Provisional Application Ser. No. 60/514,699, filed Oct. 27, 2003, entitled "SYSTEM AND METHOD FOR NETWORK DEVICE COMMUNICATION," each of which is incorporated by reference herein in its entirety.

REFERENCE TO COMPUTER PROGRAM LISTING APPENDIX ON COMPACT DISC

Computer Program Listing Appendices A-D are contained on one compact disc and are hereby incorporated herein by reference in their entireties. Computer Program Listing Appendix A is stored on the compact disc as a file named Appendix A.txt. Computer Program Listing Appendix B is stored on the compact disc as a file named Appendix B.txt. Computer Program Listing Appendix C is stored on the compact disc as a file named Appendix C.txt. Computer Program Listing Appendix D is stored on the compact disc as a file named Appendix D.txt.

FIELD OF THE DISCLOSURE

The present disclosure relates generally to a method and system for network device communication.

BACKGROUND

In typical hypertext transfer protocol (HTTP) communications, one host is considered the HTTP client and initiates communication with another host, the HTTP server. The HTTP client requests the connection and, if the HTTP server accepts the connection, the client then transfers data to the server and waits for a response from the server. The response from the server might be as simple as an acknowledgement of the data from the client or the response might include data that was requested by the client.

Often, a host in a TCP/IP network is located "behind" a firewall—meaning that network access to the host from outside the firewall is greatly limited or restricted entirely. Hosts that are located behind a firewall are typically configured with a private IP address that is unique to its own intranet but is not valid for use on the public Internet.

Using a Network Address Translation (NAT) proxy or Network Address and Port Translation (NAPT) proxy, it is possible to map the private IP address on the intranet to a valid public IP address on the Internet. This can allow the host behind the firewall to establish communication with another host outside the firewall. Typically the configuration of the NAT proxy does not allow a host outside the firewall to initiate a connection to a host behind the firewall.

This type of environment which includes a client behind the firewall communicating with a server outside the firewall is referred to as a "post-only" environment because a client is able to post a request out to a server but a client outside the firewall is unable to post a request to a server behind the firewall. A post-only environment may be used for security so that a host behind the firewall is not subject to traffic from the public Internet.

As long as the hosts behind the firewall are acting as HTTP clients with respect to HTTP servers outside the firewall, the post-only environment works. However, if hosts behind the firewall act as an HTTP server with respect to HTTP clients outside the firewall, the post-only environment will not allow communication. Alternately, the firewall may allow access to the host from the public Internet. However, exposing the host increases the security risk to the host since it is now accessible from the public Internet and consumes resources in terms of public IP addressing. Leaving the host behind a limited access firewall limits accessibility of the host's HTTP server to those hosts that are also behind the firewall. In certain applications these options may be unacceptable. As such, an improved method and system for communicating with hosts behind a firewall would be desirable.

SUMMARY

In one particular embodiment, the disclosure is directed to a method for communicating with a monitoring device. The method includes sending an unsolicited-type message from a client program resident on the monitoring device coupled to a first secure network. The unsolicited-type message is sent to a computing system coupled to a second network separated from the first secure network by a firewall. The method also includes receiving a response message to the unsolicited-type message from the computing system. The response message includes an embedded unsolicited-type message. The client program is resident on the monitoring device receiving the response message. The method further includes providing the embedded unsolicited-type message to a server program resident on the monitoring device.

In a further embodiment, the disclosure is directed to a method for communicating with a monitoring device. The method includes receiving an unsolicited-type message via a first network from the monitoring device coupled to a second secure network separated from the first network via a firewall, determining whether a request item is to be sent to the monitoring device, and sending a response message responsive to the unsolicited-type message to the monitoring device.

In another embodiment, the disclosure is directed to a host system including a processor, a network interface responsive to the processor and memory responsive to the processor. The memory includes a client program operable by the processor to communicate with a remote system via the network interface. The client program is operable to send an unsolicited-type message via the network interface and to receive a response message associated with the unsolicited-type message. The response message includes an embedded request. The memory also includes a server program operable by the processor to receive the embedded request.

In a further embodiment, the disclosure is directed to a networked computer system including a first host device, a firewall and a second host device. The first host device includes a client program and a server program. The first host device is coupled to a first network. The firewall is coupled to the first network and to a second network and separates the first network and the second network. The firewall provides post-only access from the first network to the second network. The second host device is coupled to the second network. The second host device is configured to receive a post message from the client program of the first host device and to embed an unsolicited-type message in a response message associated with the post message. The second host device is configured to send the response message to the client program of the first host device.

In another exemplary embodiment, the disclosure is directed to an unsolicited-type message including header data and embedded data. The embedded data is responsive to a response message. The response message includes a header and an embedded request.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DISCLOSURE

This disclosure describes a method and system that allows a client on the outside of a firewall to communicate with a server behind a firewall in a secure environment. A host behind a firewall includes both a client and a server. The client is configured to post a message to a remote system and receive a response to the post message that includes encapsulated requests. The client may parse the encapsulated requests, provide the encapsulated request to the server and receive results associated with the requests from the server. The client may then send a subsequent post message to the remote system including the response to the encapsulated requests.

Figure 1:
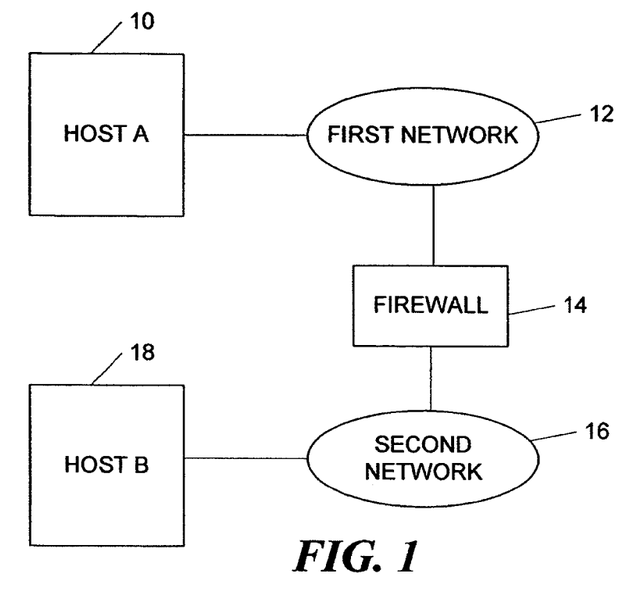
FIG. 1 includes a diagram illustrating an exemplary embodiment of a network communication system.

As shown in FIG. 1, Host A 10 is connected to a first network 12. The first network 12 is connected to a second network 16 via a firewall 14. The firewall 14 provides a secure environment in the first network 12 by limiting the types of communication methods that may be used to access computing devices, such as Host A 10, connected to the first network 12. Computing resources, such as Host B 18 connected to the second network 16 may be prevented from communicating with computing resources, such as Host A 10, using queries, requests, and other unsolicited communication methods. For example, the firewall 14 may prevent Host B 18 from sending unsolicited-type messages, such as hypertext transfer protocol (HTTP) POST messages, HTTP GET messages, or file transfer protocol (FTP) messages.

On the other hand, the firewall 14 may permit unsolicited communications, queries, and requests, such as HTTP POST messages, to pass from the first network 12 to the second network 16 and may further permit response messages, such as a response to HTTP POST messages, to pass from the second network 16 to the first network 12. Host A 10 may access Host B 18 using unsolicited-type messages. For example, Host A 10 may periodically request information from Host B 18 using an unsolicited-type communication message. Host B 18 may respond with a response message with an embedded or encapsulated query, request, or instructions. Host A 10 may process the request, query, or instructions and include the information or data associated with the embedded instruction in a further unsolicited-type message. However, the firewall 14 may prevent Host B 18 and other computing devices connected to network 16 from communicating with Host A 10 using unsolicited-type communication messages.

In one exemplary embodiment, Host A 10 is connected to a first network 12, such as a local area network (LAN) or wide area network (WAN). The firewall 14 prevents communications and messages using particular unsolicited-type messages, such as HTTP POST messages, from passing from the second network 16 to the first network 12. For example, the second network 16 may be a global network, such as the Internet, or a WAN. Host B 18 is, therefore, prevented from accessing Host A 10 using unsolicited-type messages and communication methods. If the firewall 14 permits request, queries, and unsolicited-type messages, such as HTTP POST messages, to pass from the first network 12 to the second network 16 and further permits response messages to pass from the second network 16 to the first network 12, Host A 10 may send an unsolicited-type message, such as an HTTP POST message to Host B 18. Host B 18 may respond to the HTTP POST message with a response having an embedded request, query, or instructions. Host A 10 may parse the message, react to the request, query, or instructions, and include information in a subsequent HTTP POST message.

For example, Host A 10 may be a device that monitors environmental conditions relating to a physical space or equipment, a device that monitors network equipment operability, or a computer system having settings, parameters and programs that may be manipulated remotely. In one exemplary embodiment, Host A 10 sends an HTTP POST message to Host B 18 periodically or in response to an event, such as a threshold violation or equipment failure. The HTTP POST message may include embedded data. Host B 18 may include a server that receives and processes the HTTP POST and determines whether requests are queued for sending to HOST A 10. Host B 18 may also store or process data included in the HTTP POST. Using information or requests from the queue if available, Host B 18 provides a response to the HTTP POST message. The response may include embedded queries, request, parameter updates, program updates, or settings. In one exemplary embodiment, the embedded request is in the form of an embedded unsolicited-type message.

In one exemplary embodiment, the firewall 14 may permit Host A 10 to receive the response. Host A 10 processes the response and parses queries or requests. Host A 10 may include data resulting from the processing in a subsequent HTTP POST message.

In an alternative embodiment, a host may be located or connected to a network that is not addressable or in which addressing changes frequently. In one exemplary embodiment, the host may be located on a wireless network, such as global system for mobile computing (GSM) networks and general packet radio service (GPRS) networks. Such networks create a substantially equivalent post-only environment. In addition, the methods described herein may be applicable for networking systems in which addresses are dynamically allocated and change frequently.

Figure 2:
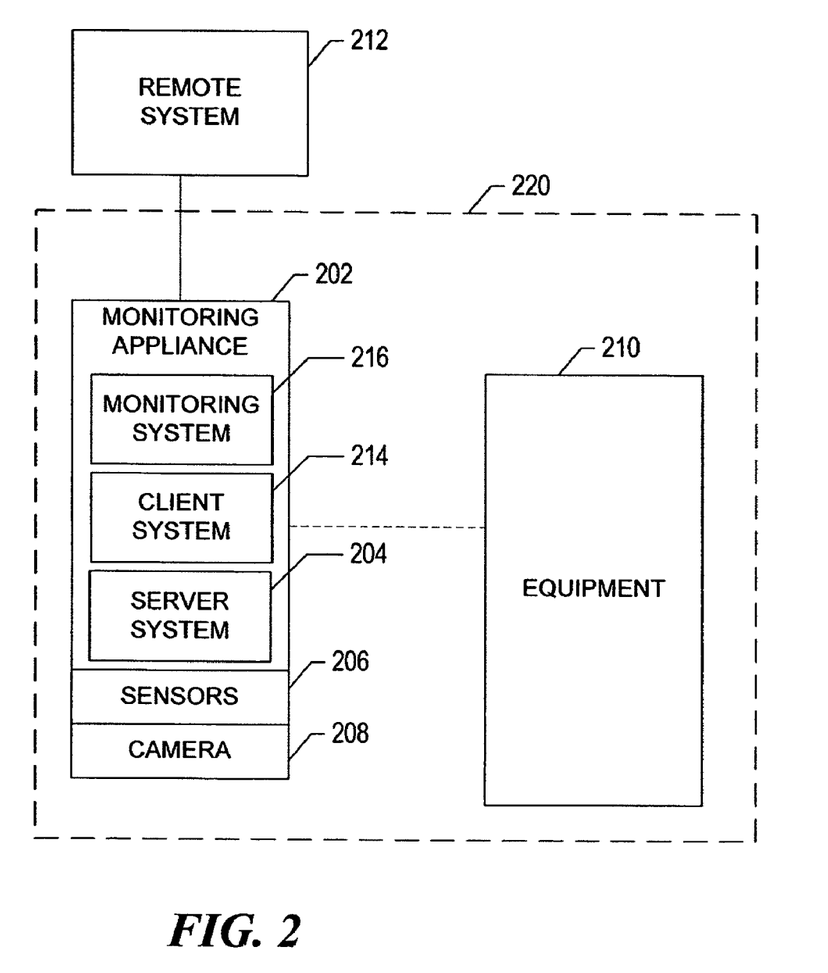
FIG. 2 includes a diagram illustrating an exemplary monitoring system.

In one particular embodiment, the host system may be a monitoring system. For example, the monitoring system may be configured to monitor a physical space about network equipment. FIG. 2 depicts an exemplary monitoring system. A monitoring appliance or device 202 monitors a physical space 220 and, in some embodiments, equipment 210, such as computer equipment. The monitoring appliance 202 may communicate data associated with the space 220 and the equipment 210 to a remote system 212. For example, the monitoring appliance 202 may gather environmental data, such as temperature, air flow, humidity, leak detection, power quality, and motion detection and communicate that data to the remote system 212.

The monitoring appliance 202 includes a monitoring system 216. The monitoring appliance 202 may also include or communicate with sensors 206 or cameras 208. The monitoring system 216 may interact with the sensors 206 and camera 208 to gather data, store the data, and compare that data to a set of expected conditions or ranges. The monitoring system 216 may be triggered to send data to the remote system 212 upon violation of expected conditions or when events occur that are flagged for communicating with the remote system 212.

When the monitoring appliance 202 is located on a network accessible by the remote system 212, the remote system 212 may periodically access the server system 204 to acquire data. However, if the monitoring appliance 202 is located within a post-only environment or secure network, the remote system 212 is prevented from accessing the server system 204 using unsolicited-type messages, such as HTTP POST messages.

Alternatively, the client system 214 may periodically contact the remote system 212 or may contact the remote system 212 when an alert condition occurs using an unsolicited-type message. In other examples, the client system 214 may initiate a response periodically, when alarm conditions occur, when there is a change of status in the device, when a configuration change is noted, such as removal or addition of a sensor or sensor pod, and when network activity status changes, such as when an address changes, an alternate network is down, or network traffic is low.

The remote system 212 may embed a request for data, configuration data, or program updates in a response message responsive to the unsolicited-type message. In one particular embodiment, the embedded request or data is formatted as an unsolicited-type message. The client system 214 may receive the response message including the embedded message, parse the embedded message and provided the embedded message to the server system 204. In one exemplary embodiment, the client system 214 and the server system 204 communicate using HTTP protocols.

In one exemplary embodiment, the remote system 212 embeds a request for data including status data, alert status, pictures, audio data, video data, sensor data, configuration data and various multipurpose internet mail extension (MIME) type data. In addition, the remote system 212 may embed instructions and data for updating device configuration, threshold policies, and software. In response, the server system 204 may provide response messages to the client system 214 including the data, such as status data, alert status, image data, audio data, video data, sensor data, configuration data and various MIME-type data. The server 204 may also provide update status data via the client system 214, such as messages confirming a successful update.

In one particular embodiment, the client system 214 and communication with the remote system 212 is transparent to the monitoring system 216 and its interaction with the server system 204. With little reconfiguration of the server system 204 and the monitoring appliance 202, the client system 214 can be implemented to facilitate communication when the monitoring appliance 202 is connected to a secure network.

Figure 3:
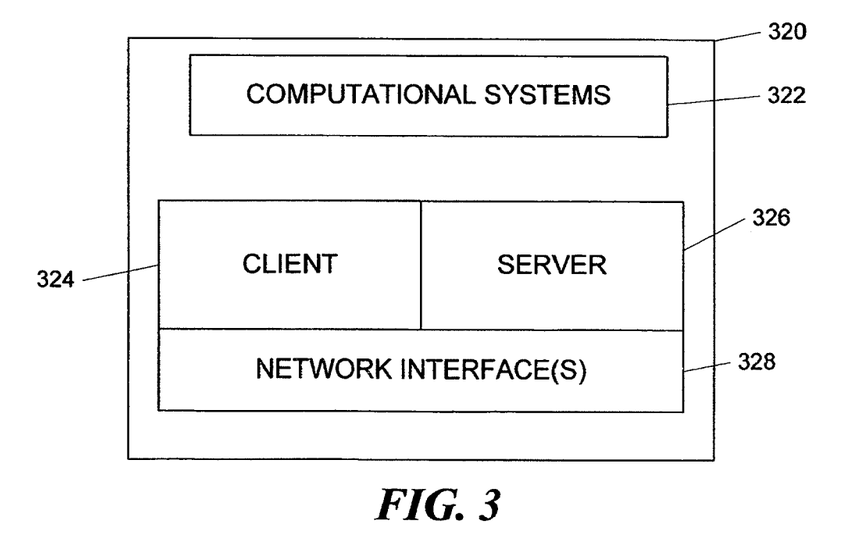
FIG. 3 includes a diagram illustrating an exemplary embodiment of a host system.

FIG. 3 depicts an exemplary host 320. For example, the host 320 may be a device for monitoring environment parameters associated with a space and for monitoring network equipment operability. The host 320 includes computational systems 322, such as processors and computational circuitry. The computational systems 322 may include parameters, settings, and programs that may be manipulated remotely.

In one exemplary embodiment, the host 320 also includes a client program 324 and a server program 326. For example, the client program 324 and the server program 326 may reside in memory within the host 320. In a secure computing environment, such as a POST-only environment, the client 324 communicates via a network interface 328 using unsolicited messages, such as HTTP POST messages, to devices outside the firewall. The client 324 may also parse responses and provide the parsed responses to the server 326 for further processing. For example, the response may include an encapsulated request, such as HTTP GET messages and HTTP POST messages. The client may provide the HTTP GET message to the server 326 using HTTP or similar protocols. The server 326 may provide data and information to the client 324 for inclusion in a subsequent HTTP POST message. For example, the server 326 may provide measurement data, sensor values, images, operating parameters and settings, and program version information to the client 324 in a response message to the HTTP GET message. The client 324 may encapsulate the response message in an HTTP POST message. In an alternative embodiment, the client 324 and server 326 may be housed separately, both residing behind a firewall.

Figure 4:
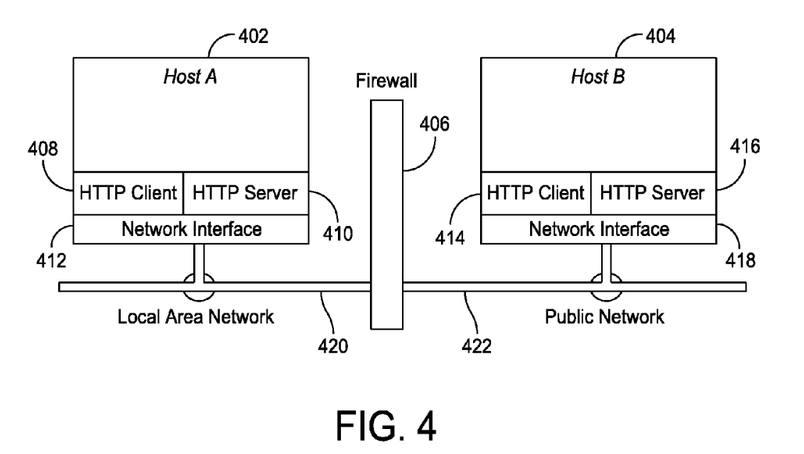
FIGS. 4-10 include diagrams illustrating exemplary embodiments of host communication.

Outside the firewall, another host may receive the POST message via a network interface using a server. A client may be accessed to determine whether requests, queries, or data are queued for delivery to the host behind the firewall. The host outside the firewall may include this information in a POST response message. An exemplary embodiment of the system is shown in FIG. 4.

In one exemplary embodiment, the disclosure is directed to accessing and configuring a device and querying the device via the device's HTTP interface when the device is behind a firewall. As shown in FIG. 4, an HTTP client 408 resident on Host A 402 located on secure network 420 behind the firewall 406 initiates a connection to the HTTP server 416 resident on Host B 404 located on network 422 on the outside of the firewall 406. Host B 404 embeds one or more HTTP requests in its response to the HTTP client 408 resident on Host A 402. When the HTTP client 408 of Host A 402 receives these HTTP requests, the client 408 parses and sends the requests to an HTTP server 410 resident on Host A 402. The client 408 may post the results received from the server 410 and associated with the requests to the HTTP server 416 of Host B 404 located outside of the firewall 406 by embedding the response to the request in a subsequent POST message addressed to the server 416 of Host B 404. While the example above and the examples described in relation to FIGS. 5-12 are described using HTTP protocols, the communications may alternatively be implemented using HTTP over secure socket layer (HTTPS) protocols.

Figure 5:
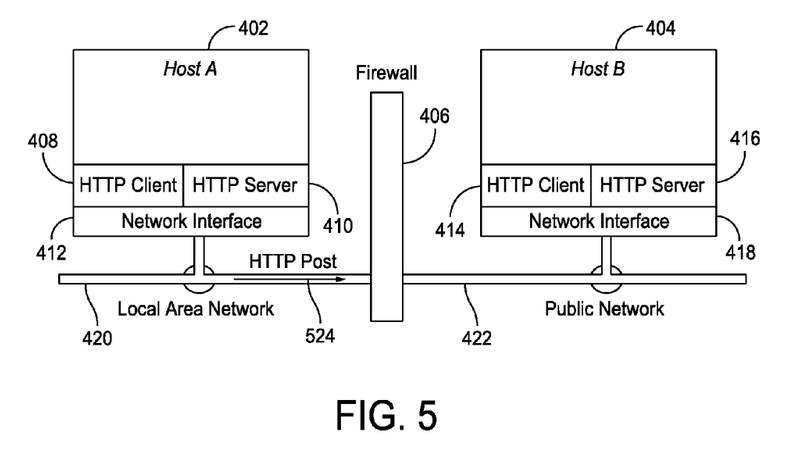

In one particular embodiment shown in FIGS. 5-12, a communication chain begins with a periodic HTTP post 524 from the HTTP client 408 of Host A 402, as shown in FIG. 5. In one embodiment, the posting is periodic in nature because Host A 402 has no knowledge of if or when Host B 404 may have requests for Host A 402. Alternatively, Host A 402 may send an HTTP post 524 upon a change of status, an alert condition, or an event associated with Host A 402. In one exemplary embodiment, HTTP post 524 identifies Host A 402 and its current status and provides an opportunity for the receiving HTTP server 416 of Host B 404 to submit further queries and configuration updates in the response to the post

524. These further queries and configuration updates may, for example, take the form of a HTTP message encapsulated in a response message.

In one exemplary embodiment, the server 416 of Host B 404 contacts HTTP client 414 resident on Host B 404 to determine whether the client 414 has a set of post messages or queries queued to send to Host A 402. For example, the client 414 may have a queue of requests. When a message is received from Host A 402, the client 414 may provide a set number of requests from the queue to be embedded in a multipart form type response to the post message from Host A 402.

Figure 6:
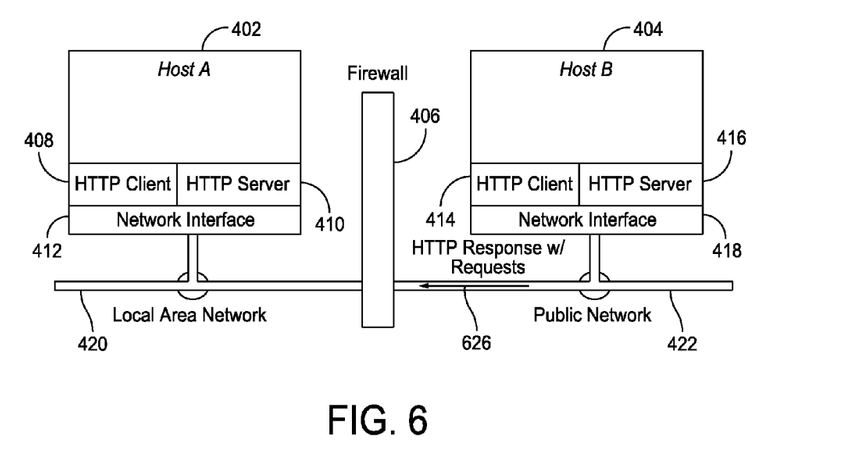
Figure 11:
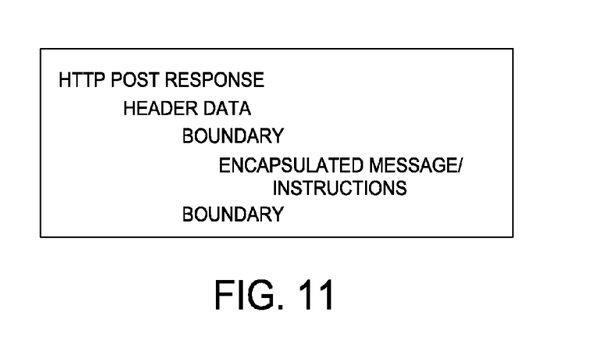
FIGS. 11 and 12 include diagrams illustrating exemplary embodiments of messages.

If the receiving HTTP server 416 of Host B 404 does not request any further communication with Host A 402, Host B 404 responds to the post with an HTTP status code and headers. For example, when the client 414 has no messages for Host A 402, the server 416 may send the status code and headers as a response. As a result, the communication ends until the next post from Host A 402. However, if the receiving HTTP server 416 in Host B 404 requests further communication with Host A 402, the server 416 supplies one or more requests (queries, configuration updates, etc.) in the response 626, as shown in FIG. 6. In one exemplary embodiment, each request includes an associated unique identification. For example, FIG. 11 depicts a HTTP POST response message including encapsulated instructions. These instructions may or may not be separated into a multipart message with boundary strings as shown.

Figure 7:
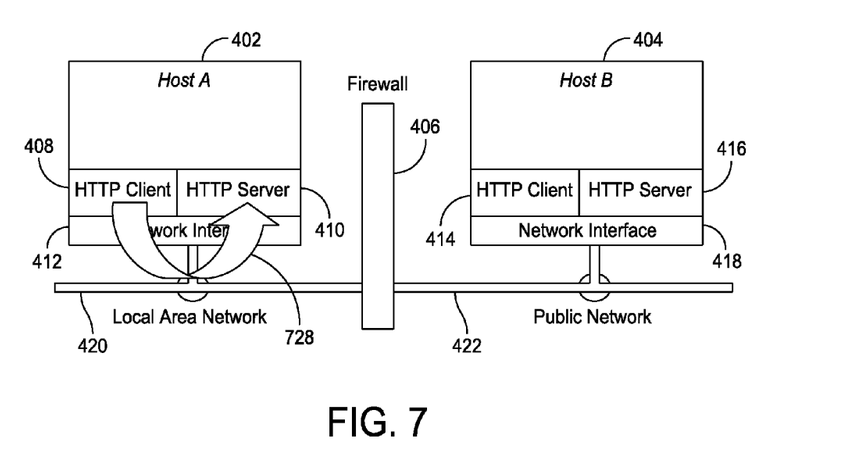

The HTTP client 408 of Host A 402 may parse the response from the HTTP server 416 of Host B 404 to determine whether the response includes one or more requests or instructions. When a request or instruction 728 is found, the request 728 is provided to the local HTTP server 410 on Host A 402, as shown in FIG. 7. For example, the response 626 may include embedded HTTP-type messages that may be passed to the HTTP server 410 of Host A 402 using HTTP communication. When a request is not found, the communication ends until the next post from Host A 402.

Figure 8:
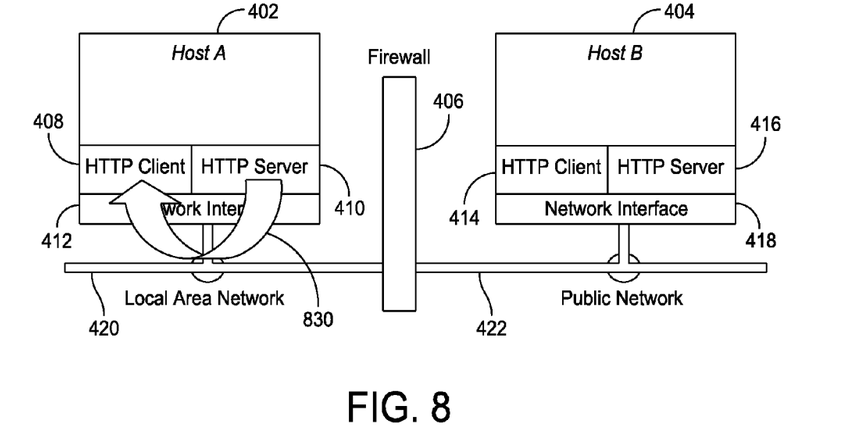
Figure 9:
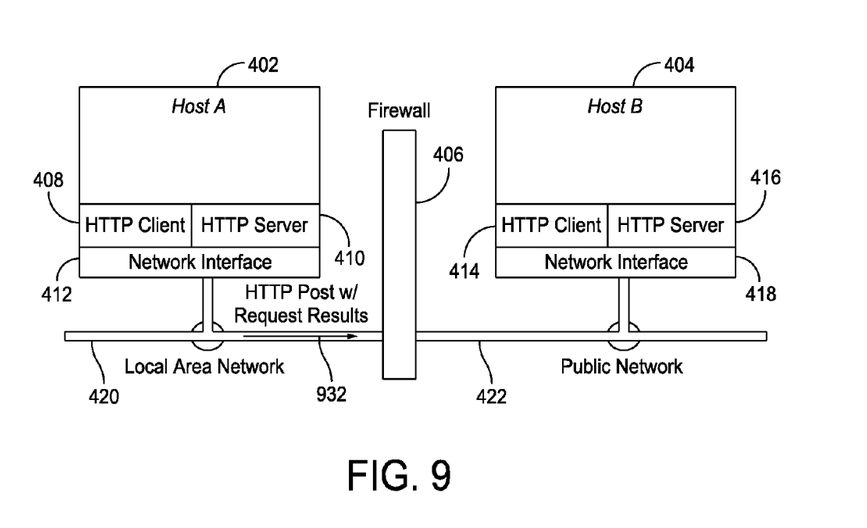
Figure 12:
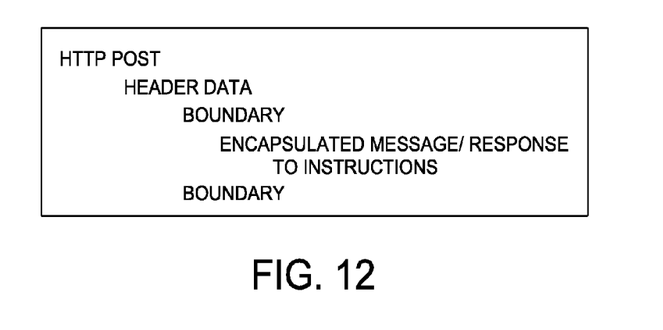

Once the requests 728 have been submitted to the local HTTP server 410, the HTTP server 410 acts on the instructions or request and communicates results 830 of the request or instructions to the HTTP client 408 of Host A 402, using for example HTTP communications, as shown in FIG. 8. Once the results have been read from the local HTTP server 410 of Host A 402, the HTTP client 408 of Host A 402 initiates a new post 932 to the HTTP server 416 of Host B 404, as shown in FIG. 9. The post 932 includes basic identification and the output that was read from the Host A local HTTP server 410 and, for example, encapsulates HTTP messages from the local HTTP server 410 in the HTTP POST message 932 sent to Host B 404. Each response associated with a request may include the unique identifier associated with the request. FIG. 12 depicts an exemplary embodiment in which a response message and data are encapsulated in a multipart HTTP POST message.

Figure 10:
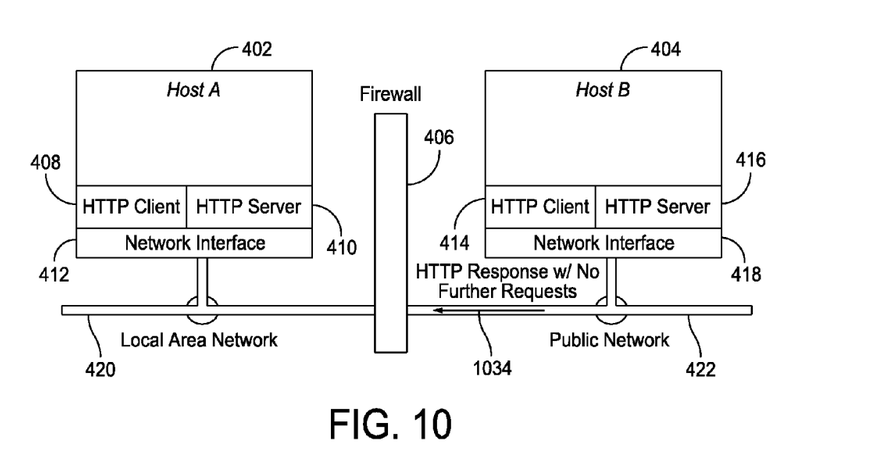

When the HTTP server 416 of Host B 404 receives the post 932 that includes the results from its requests, the server 416 may respond with any additional requests and the cycle repeats until, for example, a queue on Host B 404 is empty. For example, the server 416 of Host B 404 may parse or interpret the file. Additional HTTP messages encapsulated within the file may be passed to a Host B client 414 for processing. The Host B client 414 may provide additional HTTP GET messages for encapsulation within a server response to the HTTP POST. When the HTTP server 416 responds to a post and does not include any further requests (response 1034), the communication ends until the next post is made, as shown in FIG. 10.

In another exemplary embodiment, the initial, periodic post from Host A 402 is a multipart form post with a single part in the post that identifies the host, describes the host's current status, and indicates the period between the periodic posts. The HTTP server 416 of Host B 404 formulates a response to the initial post from Host A 402 that includes a status indication of whether the post was properly received. Furthermore, when Host B 404 desires further status information from Host A 402 or when Host B 404 is holding configuration changes that are to be sent to Host A 402, Host B 404 includes the request(s) in the response. Multiple requests from Host B 404 can be included in a single response to the post from Host A 402. When a single request is included, the request may be placed in the body of a non-multipart response. When more than one request is to be included, each request may form a separate part of a multipart response.

For a single request, a special content-type identifier is supplied in the response headers to indicate that the entire body of the response is to be considered a request for the HTTP server 410 of Host A 402. Furthermore, a request ID is supplied in the headers to uniquely identify the request.

For multiple requests, each part contains the special content-type header and request IDs to uniquely identify each part as a request for the HTTP server 410 of Host A 402. The absence of this special content-type identifier either in the response headers or in the headers contained within one of the parts may indicate that Host B 404 does not request any further communication with Host A 402.

When multiple requests are included in the response, each of the requests may be treated separately by the HTTP client 408 of Host A 402. In one exemplary embodiment, the requests are sent to the local HTTP server 410 of Host A 402 sequentially and the results from the requests are read back from the HTTP server 410 of Host A 402, sequentially. The requests may be formulated in such a way that the HTTP client 408 of Host A 402 does not need to parse the requests. The contents may be sent to the local HTTP server 410 for standard processing.

Once the results have been read from the local HTTP server 410, Host A 402 posts the results in a multipart post. Each of the results from the requests may be placed in a separate part in the multipart post. The headers included with each part include the request ID corresponding to the request that generated the results, allowing Host B 404 to correlate the response to the requests that were sent.

Figures 13, 14:
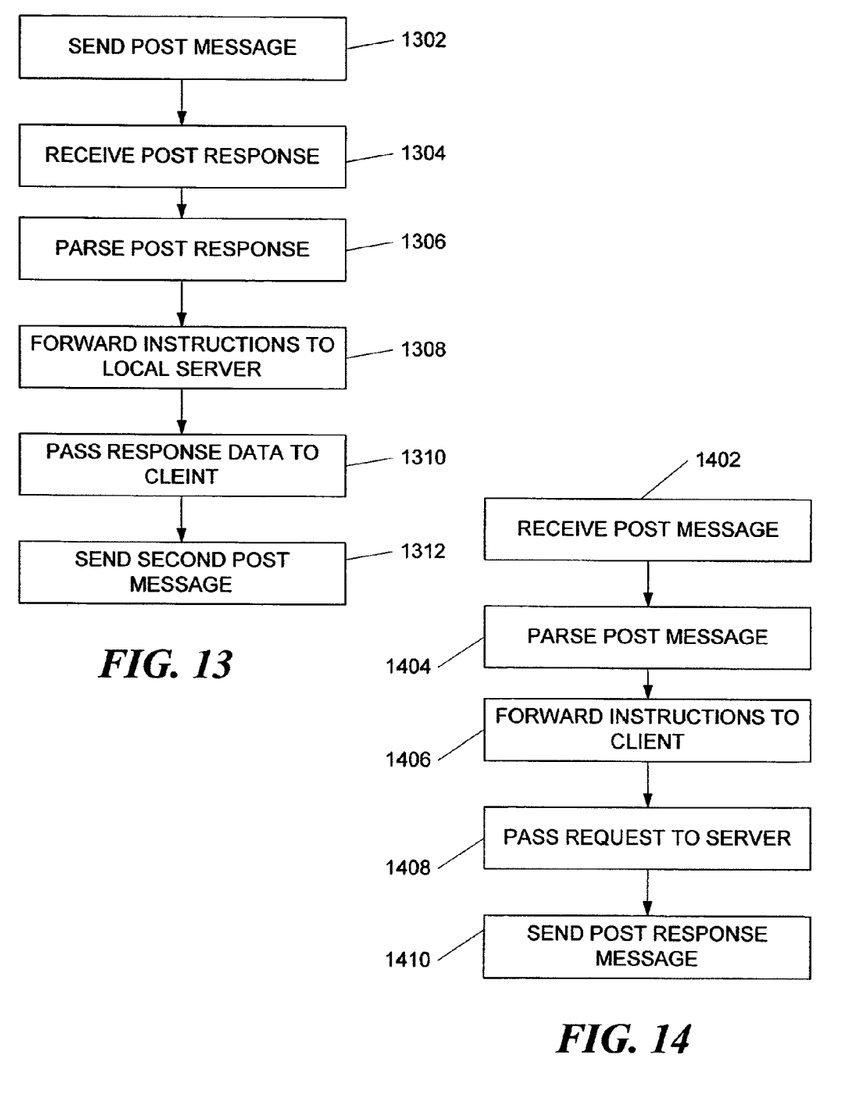
FIGS. 13 and 14 include flow diagrams illustrating exemplary methods for use by a system, such as those exemplary systems illustrated in FIGS. 1, 2, and 3.

An exemplary method for communicating with a host is illustrated in FIG. 13. A client of the host sends a POST message, as shown in step 1302. The client receives a response to the POST message from a remote server, as shown in step 1304. The client parses the POST response message, as shown in step 1306, to determine whether a request or instructions are included in the POST response. The request or instructions are forwarded to the local server, as shown in step 1308. The request or instructions may, for example, take the form of an HTTP command. The server acts on the request or instructions and passes the response data to the client, as shown at step 1310. The client encapsulates the response data in a second POST message, as shown in step 1312.

A further exemplary method for communicating with a host is illustrated in FIG. 14. A server receives a POST message, as shown in step 1402. The server may parse the POST message to determine whether there are encapsulated messages or data in the POST message, as shown in step 1404. Encapsulated messages may be passed to a client, as shown in step 1406. For example, the message may be an HTTP message, which is forwarded to the client for interpretation. The client may pass an information request or data to the server, as shown in step 1408, and the server may incorporate the request or data, and send a post response, as shown in step 1410.

In one exemplary embodiment, a host device, such as a monitoring device, may communicate with a remote data collection and configuration system. The host device and the remote system may established a secured communication link, such as through encryption and authentication. In one exemplary embodiment, the host device and remote system use HTTPS. In another exemplary embodiment, the host device provides a device identification and password to the remote system. In one particular embodiment, the unsolicited-type message sent from the host device to the remote system and the response sent from the remote system use a protocol, such as HTTPS, and the embedded messages within the unsolicited-type message and response use another protocol, such as HTTP, or the same protocol.

In one particular example, a host device when first activated is configured to contact the remote system using a first universal resource locator (URL). The remote system may authenticate the host device and establish a communications protocol for use in subsequent communications. For example, an authorized installer of the device may provide the device with a device ID and password. In one particular embodiment, the device ID and password are temporary. Once the host device is authenticated, the remote system provides a new device ID and password and a second URL for future communications.

EXAMPLES

Below are exemplary embodiment of messages using HTTP type protocols. However, these examples are intended to be illustrative. Other protocols and message types may be used.

The message in Computer Program Listing Appendix A illustrates an exemplary initial periodic post from Host A with identification and status information. The message is an HTTP POST message with multipart content type identified by a boundary string. In this example, the content is an XML message including multiple variable definitions.

The message in Computer Program Listing Appendix B illustrates an exemplary embodiment of a response from Host B with further requests. The message contains a multipart form response. Each request is contained within one part of the response, tagged with a unique response key, and separated by a boundary string. Each request is in the form of an HTTP GET command. A client receiving the message may parse the message and forward the GET commands to a local server. In an alternative embodiment, the response may include non-multipart content representing a single request.

The message in Computer Program Listing Appendix C illustrates an exemplary embodiment of a follow-up post from Host A with the results of the GET commands. The multipart content includes boundary-separated data. The first set of data is an XML data set. The second set of data is an encapsulated HTTP message identified as the response to the first GET command by the filename. The filename is the same as the response key. The third set of data is an encapsulated HTTP message identified as the response to the second GET command by the filename. The fourth set of data is an encapsulated HTTP message identified as the response to the third GET command by the filename. A receiving server on Host B may parse the POST and forward the HTTP messages to a local client.

The message in Computer Program Listing Appendix D illustrates an exemplary response from Host B with no further requests.

While the examples presented are HTTP messages, other protocols such as FTP may be used. Moreover, protocol messages may be encapsulated in messages having a different transfer protocol. For example, an HTTP POST response message may encapsulate an FTP message. The client and servers residing on a Host may be configured to parse or interpret instructions in several protocols.

Aspects of the disclosure may be found in a method of communicating including sending an unsolicited-type message from a first host connected to a first secure network to a second host connected to a second network; receiving a response to the unsolicited-type message from the second host, the response including a request message; and sending a second unsolicited-type message from the first host to the second host, the second unsolicited-type message including data associated with the request message.

Further aspects of the disclosure may be found in a method of communicating including receiving an unsolicited-type message from a first host connected to a first secure network using a second host connected to a second network; sending a response to the unsolicited-type message from the second host, the response including a request message; and receiving a second unsolicited-type message from the first host.

Additional aspects of the disclosure may be found in a message including a response header associated with an unsolicited-type message and instructions configured for processing such message with a host server.

Another aspect of the disclosure may be found in an unsolicited-type message including an unsolicited type header and data associated with instructions received via a response message.

Further aspects of the disclosure may be found in a host device including a client module, a server module, and a network interface. The client module is configured to send an unsolicited-type message to a second device and interpret a response message associated with the unsolicited-type message to identify instructions. The client module is configured to transfer the instructions to the server module. The server module is configured to act on the instructions and transfer information to the client. The client is configured to send a second unsolicited-type message including the information via the network connection.

Additional aspects of the disclosure may be found in a network system including a first host connected to a first network section and a second host connected to a second network section. The first network section and the second network section are connected through a network security device. The network security device prevents unsolicited communication from passing from the second network section to the first network section. The first host is configured to send an unsolicited-type message to the second host. The second host is configured to respond to the unsolicited-type message with a response that includes instructions. The first host device is configured to receive the response, parse the response, and act in accordance with the instructions. The first host is configured to send a second unsolicited-type message including data associated with the instructions.

In alternative embodiments, the methods described above may be applied to devices that gather data but move from network to network, thus changing addresses. A post message with embedded response may be useful for connecting to a fixed remote server. Such methods may be useful for mobile computing in which a computer is often relocated between networks with different security levels. For example, a sales person or a truck monitoring system may find use in such methods.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of communication between a monitoring device coupled to a first secure network and a computing system coupled to a second network separated from the first secure network by a firewall, the method comprising:
    sending, by a client program resident on the monitoring device, an unsolicited-type message to the computing system;
    receiving, by the client program, a response message to the unsolicited-type message, the response message including an embedded unsolicited-type message;
    parsing, by the client program, the embedded unsolicited-type message from the response message; and
    providing, by the client program, the embedded unsolicited-type message to a server program resident on the monitoring device.

2. The method of claim 1, further comprising preparing a second response message using the server program, the second response message responsive to the embedded unsolicited-type message.

3. The method of claim 2, wherein the second response message includes data requested in the embedded unsolicited-type message.

4. The method of claim 2, further comprising providing the second response message to the client program.

5. The method of claim 4, further comprising sending a second unsolicited-type message from the client program resident on the monitoring device to the computing system, the second unsolicited-type message including the second response message.

6. The method of claim 5, wherein the second response message includes a unique identifier associated with the embedded unsolicited-type message.

7. The method of claim 1, wherein the embedded unsolicited-type message includes a request for data.

8. The method of claim 1, wherein the embedded unsolicited-type message includes configuration data.

9. The method of claim 1, wherein the embedded unsolicited-type message includes program update data.

10. The method of claim 1, wherein the unsolicited-type message includes an HTTP POST message.

11. The method of claim 1, wherein the embedded unsolicited-type message includes an HTTP GET message.

12. A method of communication between a monitoring device coupled to a first secure network and a host computer coupled to a second network separated from the first secure network by a firewall, the method comprising:
    receiving, by the host computer, a first unsolicited-type message from the monitoring device;
    embedding a second unsolicited-type message within a response message, the second unsolicited-type message addressed to a server program resident on the monitoring device, and
    sending, by the host computer, the response message to a client program resident on the monitoring device.

13. The method of claim 12, wherein the first unsolicited-type message includes an HTTP POST message.

14. The method of claim 12, further comprising receiving a third unsolicited-type message including an embedded response message associated with the second unsolicited-type message.

15. The method of claim 12, wherein the second unsolicited-type message includes an HTTP GET message.

16. A host system comprising:
    a processor;
    a network interface coupled to the processor; and
    memory coupled to the processor and including:
        a server program having instructions that configure the processor to:
            receive an embedded request; and
            execute the embedded request; and
        a client program having instructions that configure the processor to:
            send an unsolicited-type message via the network interface;
            receive a response message associated with the unsolicited-type message,
        the response message including the embedded request;
            parse the embedded request from the response message; and
            provide the embedded request to the server program.

17. The host system of claim 16, further comprising a monitoring system, wherein the server program has instructions that configure the processor to access the monitoring system.

18. The host system of claim 17, wherein the monitoring system is coupled to a sensor.

19. The host system of claim 16, wherein the server program has instructions that configure the processor to prepare response data based on the embedded request and communicate the response data to the client program.

20. The host system of claim 19, wherein the client program has instructions that configure the processor to embed the response data in a second unsolicited-type message and communicate the second unsolicited-type message to a remote system via the network interface.

* * * * *